(12) United States Patent
Müller

(10) Patent No.: US 10,618,244 B2
(45) Date of Patent: Apr. 14, 2020

(54) PIPE PRODUCT AND METHOD FOR PRODUCING SAME

(71) Applicant: Benteler Steel/Tube GmbH, Paderborn (DE)

(72) Inventor: Ulrich Müller, Paderborn (DE)

(73) Assignee: Benteler Steel/Tube GmbH, Paderborn (DE)

( * ) Notice: Subject to any disclaimer, the term of this patent is extended or adjusted under 35 U.S.C. 154(b) by 0 days.

(21) Appl. No.: 15/563,416

(22) PCT Filed: Mar. 24, 2016

(86) PCT No.: PCT/EP2016/056541
§ 371 (c)(1),
(2) Date: Sep. 29, 2017

(87) PCT Pub. No.: WO2016/156198
PCT Pub. Date: Oct. 6, 2016

(65) Prior Publication Data
US 2018/0087160 A1 Mar. 29, 2018

(30) Foreign Application Priority Data
Mar. 30, 2015 (DE) .................. 10 2015 104 887

(51) Int. Cl.
*B32B 1/08* (2006.01)
*B32B 15/08* (2006.01)
*B32B 15/01* (2006.01)
*B32B 15/085* (2006.01)
(Continued)

(52) U.S. Cl.
CPC .............. *B32B 1/08* (2013.01); *B32B 15/013* (2013.01); *B32B 15/08* (2013.01); *B32B 15/082* (2013.01);
(Continued)

(58) Field of Classification Search
CPC ......... B32B 1/08; B32B 15/013; B32B 15/08; B32B 15/082; B32B 15/085; B32B 15/09; B32B 15/18; C23C 2/06; C23C 2/38; C23C 28/3225; C25D 5/10; C25D 5/36; C25D 5/48; C25D 5/50; C25D 7/04
See application file for complete search history.

(56) References Cited

U.S. PATENT DOCUMENTS

2004/0197594 A1   10/2004   Suzuki et al.

FOREIGN PATENT DOCUMENTS

| DE | 19531708 C2 | 3/1996 |
| DE | 69311963 T2 | 2/1998 |

(Continued)

*Primary Examiner* — Walter Aughenbaugh
(74) *Attorney, Agent, or Firm* — Pandiscio & Pandiscio

(57) ABSTRACT

The present invention relates to a tube product (1) with a base tube (10) made of a steel alloy with an inner circumference surface and an outer circumference surface, wherein the base tube (10) has a coating system (100) on at least part of the circumference surfaces, which has the following layer structure:
- zinc layer (11) with a predominant zinc portion;
- passivation layer (12), which is Cr-VI-free;
- sealing layer (13)

characterized in that the zinc layer (11) comprises at least three tiers (110), the sealing layer (13) has organic compounds which are based on plastics and the sealing layer (13) on the passivation layer (12) has a layer thickness between 0.5 and 15 µm. Furthermore the invention relates to a method for manufacturing such tube product (1).

20 Claims, 3 Drawing Sheets

(51) Int. Cl.
- B32B 15/082 (2006.01)
- B32B 15/09 (2006.01)
- B32B 15/18 (2006.01)
- C25D 5/36 (2006.01)
- C25D 5/10 (2006.01)
- C25D 7/04 (2006.01)
- C25D 5/48 (2006.01)
- C25D 5/50 (2006.01)
- C23C 2/06 (2006.01)
- C23C 2/38 (2006.01)
- C23C 28/00 (2006.01)
- F16L 58/08 (2006.01)
- F16L 58/10 (2006.01)

(52) U.S. Cl.
CPC ............ *B32B 15/085* (2013.01); *B32B 15/09* (2013.01); *B32B 15/18* (2013.01); *C23C 2/06* (2013.01); *C23C 2/38* (2013.01); *C23C 28/3225* (2013.01); *C25D 5/10* (2013.01); *C25D 5/36* (2013.01); *C25D 5/48* (2013.01); *C25D 5/50* (2013.01); *C25D 7/04* (2013.01); *F16L 58/08* (2013.01); *F16L 58/1054* (2013.01)

(56) References Cited

FOREIGN PATENT DOCUMENTS

| | | |
|---|---|---|
| DE | 19716428 A1 | 10/1998 |
| DE | 10308237 A1 | 9/2004 |
| DE | 10309908 A1 | 9/2004 |
| DE | 202008010569 U1 | 11/2008 |
| DE | 102008048974 A1 | 4/2010 |
| EP | 0200007 A2 | 11/1986 |
| EP | 1504891 A1 | 2/2005 |
| EP | 2770088 A1 | 8/2014 |

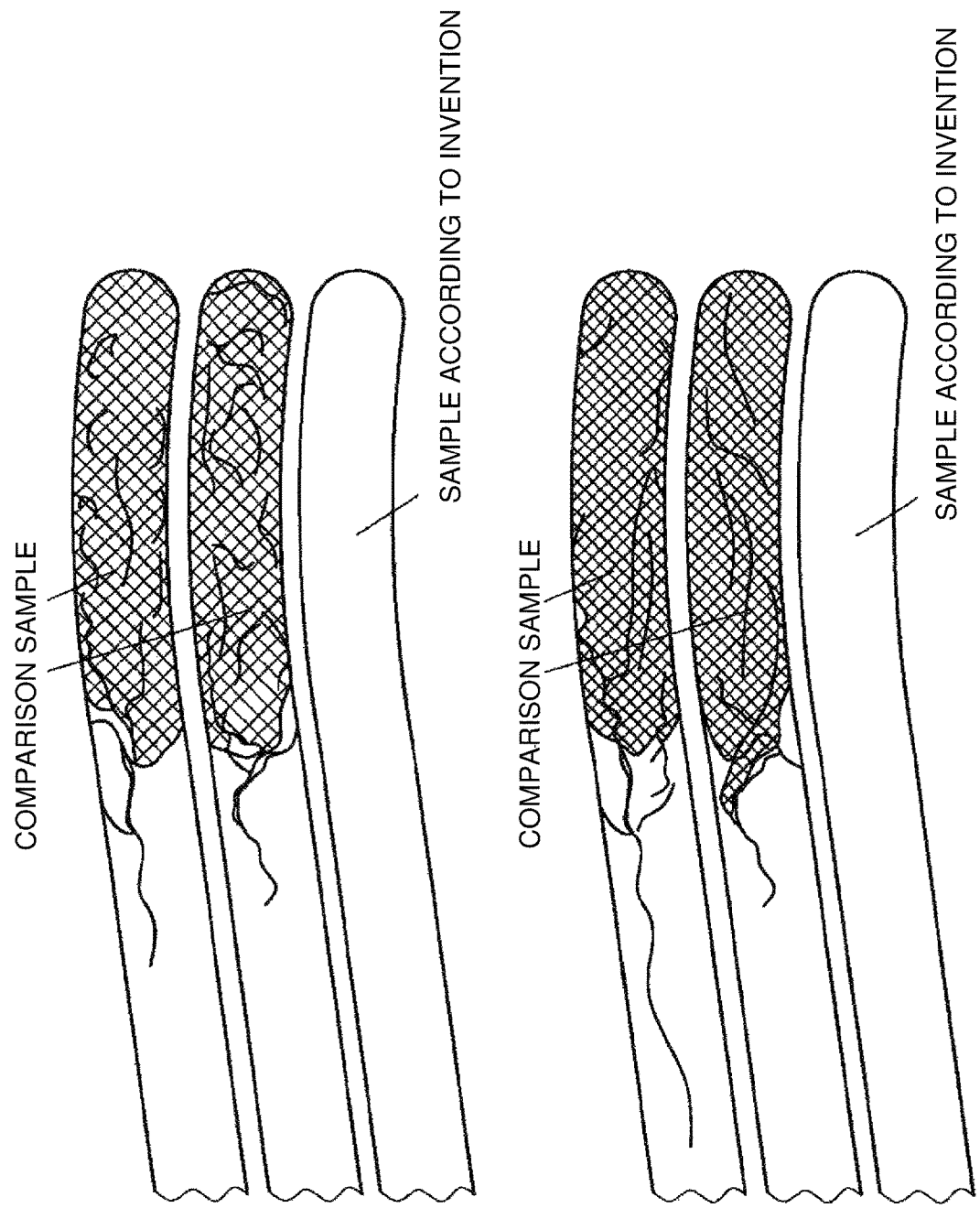

PIPE PRODUCT AND METHOD FOR PRODUCING SAME

REFERENCE TO PENDING PRIOR PATENT APPLICATIONS

This patent application claims benefit of International (PCT) Patent Application No. PCT/EP2016/056541, filed Mar. 24, 2016 by Benteler Steel/Tube GmbH for PIPE PRODUCT AND METHOD FOR PRODUCING SAME, which claims benefit of German Patent Application No. DE 10 2015 104 887.6, filed Mar. 30, 2015, which patent applications are hereby incorporated herein by reference.

FIELD OF THE INVENTION

The present invention relates to a tube product as well as to a method for its manufacturing.

BACKGROUND OF THE INVENTION

Different processes are known for protection of metallic surfaces against corrosion, in particular of surfaces of steel components.

Today, zinc coating of steel surfaces is one of the most effective methods for protection of steel components against general corrosion. Zinc coatings are widely used in the mass production of tubes, chassis components and the like. In a corrosive medium, the zinc coating or zinc layers serve as sacrificial anode (at good electrical contact with the steel surfaces) due to the less precious character of zinc compared to iron. Therefore, the zinc layer corrodes first before the iron is exposed to corrosion and forms red-brown corrosion products, which are also referred to as red rust. Pure zinc shows a relatively high corrosion speed in many corrosive media while forming voluminous white rust products, which are also referred to as white rust.

The zinc corrosion, however, may be considerably delayed by appropriate alloys and/or by suitable post treatment of the zinc layer. The latter case mainly is a so called passivation process. In such process a thin inorganic protective layer is produced on a zinc layer surface which is treated with passivation solution. This layer is also referred to as conversion layer, if cations of at least one component of the metallic surface are extracted and also used for the layer formation. This layer increases the corrosion resistance of the zinc coatings and thus the corrosion resistance of the zinc coated steel components.

The passivation processes may be used for galvanic zinc coated parts as well as for hot-dip galvanized parts. In particular for galvanic zinc coated parts different chromating processes have been developed. By treatment with a corresponding chromium-containing passivation solution, depending on the composition of this solution, clear, blue, yellow, olive green or black conversion layers form, which differ from each other in their protection value.

The passivation layer primarily serves for temporary corrosion protection of the zinc coated metal surface, for example tube surface. Due to handling, transport, storage or further processing of the tubes such a layer, however, may easily be harmed, which leads to a deterioration of the white rust resistance.

During further processing the zinc coated and passivated or chromated components, in particular tubes, are often subjected to strong forming, which exceeds the deformability of the conversion layer. During such forming unavoidably numerous cracks occur in the conversion layer due to its brittleness, which leads to a considerable deterioration of the white rust resistance or red rust resistance of the tube surface.

SUMMARY OF THE INVENTION

The object of the present invention is to provide a solution, by means of which a high corrosion resistance can be ensured even after forming of a tube product.

According to a first aspect, the invention relates to a tube product with a base tube made of a steel alloy with an inner circumference surface and an outer circumference surface, wherein the base tube has a coating system on at least part of the circumference surfaces, which has the following layer structure:
  zinc layer with a predominant zinc portion;
  passivation layer, which is Cr-VI-free;
  sealing layer.
The tube product is characterized in that
  the zinc layer comprises at least three tiers,
  the sealing layer has organic compounds which are based on plastics and
  the sealing layer on the passivation layer has a layer thickness between 0.5 and 15 µm.

According to the invention, a base tube provided with a coating system is referred to as tube product. Intermediate products, for example the base tube provided with a zinc layer, will hereinafter also be referred to as tube. The base tube consists of a steel alloy and thus can also be referred to as steel substrate. The base tube is a hollow profile. The cross section of the tube product and in particular of the base tube according to the invention may be round, oval or even angular. The base tube has an inner circumference surface and an outer circumference surface. The base tube can be a longitudinally welded or seamless tube.

According to the invention, a coating system is applied on at least part of the circumference surfaces that means of the inner circumference surface and/or the outer circumference surface. Preferably, only the outer circumference surface is coated with the coating system. However, it is also possible to apply the coating system for example both on the outer circumference surface as well as on the inner circumference surface.

A coating, which consists of several layers, is herein referred to as a coating system. According to the invention the coating system has the following layer structure:
  zinc layer with a predominant zinc proportion;
  passivation layer;
  sealing layer.
The layers of the coating system are applied or created successively on the base tube.

The tube product is characterized according to the invention in that the zinc layer comprises at least three tiers. Herein zinc coatings, which are separate from each other, in particular which are applied successively and thus represent closed-off tiers and which are jointly referred to as zinc layer, are herein referred to as tiers. The tiers of the zinc layer, which are also referred to as zinc tiers, thus are crystalline single layers. The tiers of the zinc layer can be identified in a metallurgical transverse section of the coating system.

The passivation layer according to the invention is a Cr-VI-free layer. The passivation layer is created by applying passivation agent onto the zinc layer, in particular the upper zinc tier or the zinc tier which timewise has been applied last. For example, a preparation, which has chromium-III-salts or potentially cobalt-II-salt, can be used as passivation agent. However, it is also possible to use a chromium free passivation agent.

A sealing layer is created on the passivation layer. According to the invention the sealing layer has organic compounds or consists of organic compounds. For example, an aqueous dispersion of plastics can be used as sealing material or sealing agent for creating the sealing layer. Applying of the sealing layer may for example be carried out by dipping or spraying. Alternatively or additionally, the sealing layer may also be applied via mechanical processes such as paint brush application, brush application or roller application.

The sealing layer of the coating system on the passivation layer according to the invention has a layer thickness between 0.5 and 15 µm. Preferably, the sealing layer on the passivation layer has a layer thickness between 0.9 and 10 µm and preferably a layer thickness in the range from 0.5 µm to 5 µm and further preferably in the range from 0.5 to 3 µm. It has proven, that with sealing layers with a layer thickness in the range according to the present invention and in particular with smaller layer thicknesses of <=5 µm or <=3 µm on the one hand the protection of the subjacent layers can be ensured even after forming of the tube product and on the other hand a detaching of the sealing layer during the forming, for example at bending rolls, which might occur with a larger layer thickness, does not occur.

With the present invention a number of advantages can be achieved. On the one hand by applying several zinc tiers onto the base tube, the tier thickness of the individual tiers can be kept small and nevertheless a zinc coating formed by the zinc tiers can be provided, which has a sufficient layer thickness to prevent corrosion of the base tube. By means of the small tier thickness of the individual zinc tiers which is possible according to the invention also the deformability of the coating system is increased without significantly impairing the corrosion protection. This is at least partially caused by the fact, that thinner zinc tiers have a better ductility and lower tendency to cracking than thicker zinc layers. Zinc tiers with a small tier thickness can be better formed and cracks, in particular surface cracks, which would have to be feared with lager tier thickness, can be avoided. In particular, small crystals are present in the zinc tiers with the small tier thicknesses and slipping in the crystal lattice is lower than in a single-tier zinc layer, which has been applied by hot-dip galvanizing, wherein coarse crystal structures are present. In addition, the zinc tiers can be applied in a continuous process, in particular continuous zinc coating, due to the fact that the tiers can have a small thickness in the coating system according to the invention. Thereby the manufacturing of the tube product is simplified and shortened. While during batch galvanizing a current density in the coating bath of for example 0.5 to 3.5 A/dm³ has to be set, a current density of for example 20 to 40 A/dm³ is applied in continuous zinc coating. Thereby also the required treatment duration is decreased. For creating the zinc tiers according to the invention a treatment duration of for example 1 min, respectively, may be sufficient, while in batch galvanizing treatment a duration of for example 20 min is required.

As in addition to the application of zinc tiers a passivation layer is created, the corrosion protection is further improved. With the passivation agent being Cr-VI-free, the coating system is environmentally friendly and rinsing may be carried out after the application of the passivation agent without polluting the environment.

As finally a sealing layer is applied, which is at least predominantly organic, the corrosion resistance is further improved even after forming. The sealing layer, in particular with the preferred layer thickness, entails a protection against corrosion progression. In particular, an elastic spanning of zinc tiers, which have been harmed by forming of the tube product, is achieved. The sealing layer preferably consists predominantly of organic compounds. It is also within the scope of the invention, that the sealing layer entirely consists of organic compounds. In contrast to inorganic sealing agents organic compounds, which are used in the sealing agent according to the invention, are flexible, do not tend to crack formation and are not brittle. As the sealing layer of the coating system on the passivation layer according to the invention in addition has a layer thickness between 0.5 and 15 µm and preferably a layer thickness in the range of 0.5 µm to 5 µm and further preferably in the range of 0.5 to 3 µm, on one hand a sufficient flexibility and in particular bendability of the sealing layer can be ensured. On the other hand the layer is sufficiently thick to ensure a corrosion protection which lasts as long as possible and is reliable.

Hence, after application of the coating system of the tube product according to the invention forming can be carried out, in particular the tube can be bent, without reducing the corrosion protection According to a preferred embodiment the sealing layer has organic compounds which are based on plastics, in particular polymers. The organic compounds are preferably compounds on the basis of acrylates, polyesters and/or polyacrylates. It has been found, that by using such organic compounds, in particular on the basis of acrylates or polyacrylates, the corrosion protection can be ensured even after forming of the tube product.

According to one embodiment the sealing layer has at least acrylate, polyester and/or polyacrylate with a proportion of at least 70%. The content of acrylate, polyester and/or polyacrylate in the sealing agent, which is applied for creating the sealing layer, may for example be at least 15%.

In addition to acrylate, polyester and/or polyacrylate the sealing layer can preferably have nanoscale silicon oxide particles or silicates. The size of the particles may for example be in the range of 15-70 nm, preferably in the range of 20 to 60 nm.

According to a preferred embodiment the tiers in the zinc layer each have a layer thickness of 1 µm to 10 µm. With these small layer thicknesses or tier thicknesses, respectively, the effect of the improved formability and in particular ductility and the avoiding of cracks, in particular surface cracks, can be achieved. In particular, the crystal growth is limited to the individual tiers with these small layer thicknesses. According to the invention, for example four zinc tiers can be applied onto the base tube successively. However, it is also within the scope of the invention, that the number of zinc tiers is higher, for example 12. The higher the number of zinc tiers, the lower the tier thickness or layer thickness of the respective zinc tiers is set. Preferably, all zinc tiers of the coating system have the same tier thickness.

According to a preferred embodiment, the zinc layer has an overall layer thickness in the range from 3 to 40 µm, preferably in the range from 4 to 25 µm. As the zinc layer is made of several tiers, the formability of the zinc layer and thus a better corrosion protection can be ensured despite this relatively large overall layer thickness.

With the present invention tube products can be provided, with which a formed tube bend sample of the tube product with a bending angle of 180° and a bending radius of 2.5× outer tube diameter has a white rust resistance of at least 24 hours, preferably 96 hours and further preferably at least 168 hours, in the neutral salt spray test according to DIN EN ISO 9227. In particular the condition, in which no or only a minor white rust areal proportion of preferably less than 2% is present, is referred to as white rust resistance.

According to an embodiment, the formed tube bend sample has a length portion which in axial direction is arch-shaped, wherein the bending radius at the outer circumference surface is at least 1.5× outer tube diameter. Also a tube bend sample which is formed in such a way has a high corrosion resistance, in particular the above mentioned white rust resistance of at least 24 hours, preferably at least 96 hours and further preferably of at least 168 hours, due to the coating system according to the invention.

According to a further aspect the invention relates to a method for manufacturing a tube product. The method is characterized in that the method comprises at least the following steps for applying a coating system on a base tube:
- applying at least three tiers of a zinc coating with predominant zinc proportion onto the base tube made of a steel alloy;
- applying a Cr-VI-free passivation agent for creating a passivation layer on the zinc coating;
- applying a sealing agent, which has organic compounds which are based on plastics, onto the passivation layer for creating a sealing layer with a layer thickness between 1 and 15 µm.

First, at least three tiers of the zinc layer, which is also referred to as zinc coating, with a predominant zinc proportion are applied onto the base tube made of a steel alloy. Therein, initially a first tier is applied, in a subsequent step a second and in further steps the further zinc tiers are applied. The zinc coating, that means the individual tiers, are preferably applied by means of galvanic coating, galvanic zinc coating. Therein drying can be performed between two successive steps of the tier application, even though a method without such drying steps is preferred.

A Cr-VI-free passivation agent for creating a passivation layer is applied onto the thus created multitier zinc layer or zinc coating. The passivation agent can be applied to the zinc coating in a bath.

In a further step, a sealing agent, which has organic compounds, is applied onto the passivation layer for creating a sealing layer with a layer thickness between 1 and 15 µm. The layer thickness, which is created in this step, however, may also be smaller. For example, the sealing layer may have a layer thickness in the range from 0.5 to 15 µm, preferably in the range from 0.5 to 5 µm and particularly preferred in the range from 0.5 to 0.3 µm. The application of the sealing agent is preformed immediately after the application or creation of the passivation layer. Thereby, generating of a reaction layer on the passivation layer can be prevented. The sealing layer may for example be applied by means of spraying or dipping. Alternatively or additionally, the sealing layer may also be applied by means of mechanical methods, such as paint brush application, brush application or roller application. Both spraying and dipping as well as the mechanical methods can be carried out in continuous methods. In a combination of dipping or spraying with one or more of the mechanical methods, a mechanical layer thickness limitation can be performed by brushes and/or scrapers and the layer thickness can thereby be adjusted selectively.

The method according to the invention is not limited to the mentioned steps. For example, a pretreatment of the base tube, in particular a cleaning of the tube, may be carried out prior to the application of the zinc coating.

In addition, also drying of the sealing layer which is applied onto the passivation layer may be performed after the application of the sealing layer. The drying may for example be performed by pressurized air, hot air blower or weaker radiant heaters such as for example infrared radiators.

According to a preferred embodiment, the process steps for the application of the coating system are carried out as consecutive process, in particular continuous process.

The throughput rate with which the base tube is treated in the method may according to the invention be at least 5 m/min, preferably at least 10 m/min.

Conducting the method as a continuous method is in particular possible due to the fact, that the individual zinc tiers, which are applied, have a small thickness. Thereby, the manufacturing of the tube product is simplified and shortened. While in batch galvanizing a current density in the coating bath of for example 0.5 to 3.5 $A/dm^3$ has to be set, during a continuous zinc coating a current density of for example 20 to 40 $A/dm^3$ is applied. Thereby also the required treatment duration is reduced. For manufacturing of the zinc tiers according to the invention thus treatment duration of for example 1 min, respectively, may be sufficient, while in the batch galvanizing treatment duration of for example 20 min is required and therefore no continuous zinc coating is possible. The application of the individual zinc tiers preferably is carried out in an acidic galvanic zinc high performance bath. Also the application of the further layers of the coating system, in particular the passivation layer and the sealing layer preferably are performed in a continuous method according to the invention. Thus in particular the application of the entire coating system of the tube product according to the invention can be carried out in a continuous process.

According to one embodiment, the tube product is formed after the application of the coating system. For example, the tube product may be widened, rammed, flanged or the cross section thereof may otherwise be changed.

Preferably the tube product can be bended. This embodiment has the advantage that the application of the coating system can be carried out in a continuous process and only subsequently thereto the desired shape of the semi-finished product or final product is created by forming. Such forming of the coated tube product is possible with the present invention, since due to the structure of the coating system also during and after the forming of the tube product, a corrosion resistance, in particular white rust resistance, can still be reliably ensured.

According to a further embodiment, the tube product is heated, preferably inductively heated, prior to and/or after the application of the sealing layer. Heating prior to the application of the sealing layer in particular serves for drying the passivation agent. Heating after the application of the sealing layer in contrast serves for crosslinking of the preferably contained plastic in the sealing layer. Alternatively or additionally to the inductive heating also other types of heating may be used. For example hot air may be used.

BRIEF DESCRIPTION OF THE DRAWINGS

The present invention will now be described again with reference to the enclosed drawings, wherein:

FIG. 4 shows a tube sample of a tube product according to the invention in comparison to two tube samples of conventionally galvanized and passivated tubes at neutral salt spray test (NSS Test) according to DIN EN ISO 9227 after 96 hours; and FIG. 5 shows a tube sample of a tube product according to the invention in comparison to two tube samples of conventionally galvanized and passivated tubes at neutral salt spray test (NSS Test) according to DIN EN ISO 9227 after 168 hours.

DETAILED DESCRIPTION OF THE PREFERRED EMBODIMENTS

Figure 1:
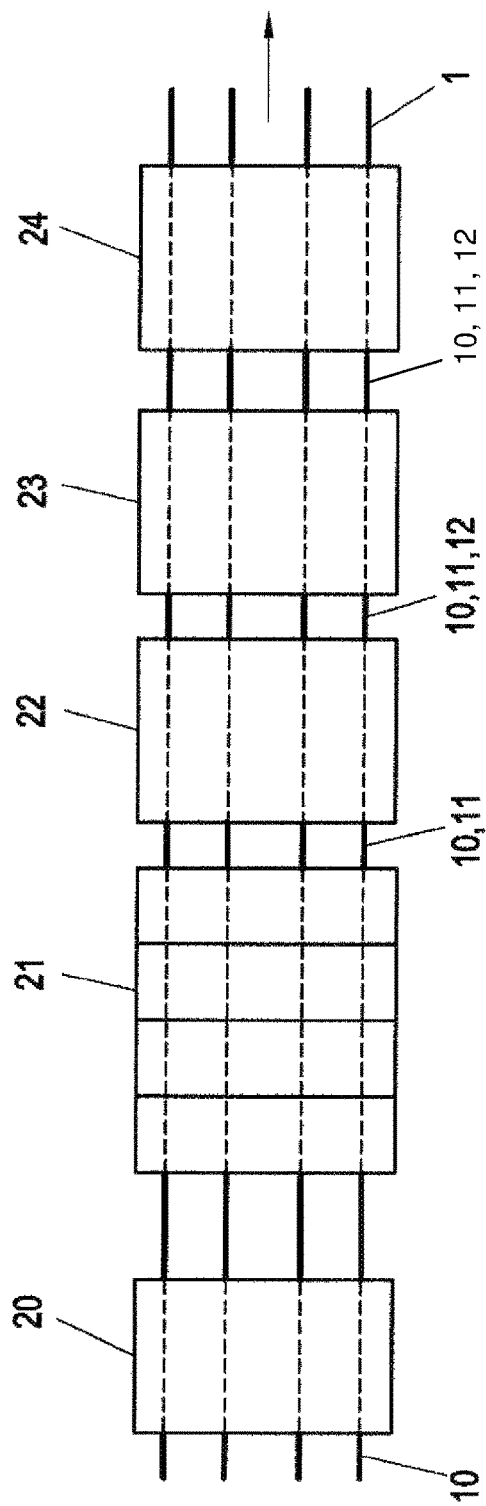
FIG. 1 shows a schematic block diagram of a line for carrying out one embodiment of the method according to the invention.

In FIG. 1 a schematic block diagram a line for carrying out an embodiment of the method according to the invention is shown. The line is shown in FIG. 1 as a four strand line, wherein four base tubes may be treated simultaneously.

In a pretreatment device 20 the base tube 10 is pretreated and in particular cleaned. In a galvanizing device 21, the zinc layer or zinc coating 11 is applied onto the base tube 10. In a passivation device 22 a passivation layer 12 is created on the zinc layer 11. In the embodiment, which is shown in FIG. 1, the thus coated tube is subsequently fed to an induction device 23, wherein the passivation agent of the passivation layer 12 is dried. Finally, the tube is fed to a sealing device 24, in which the sealing layer 13 is applied onto the passivation layer 12. A further heating device, for example hot air device (not shown), in which the sealing layer 13 is cured in particular by crosslinking of plastics of the sealing agent, may be arranged after the sealing device 24.

The galvanizing device 21 in the depicted embodiment is designed as a four stage type. For example, four galvanic zinc coating baths may be connected in series. Between the individual stages of the galvanizing device 21, in particular between the baths, drying devices (not shown) may be provided, which respectively dry the zinc tier 110 which has been created in the previous stage. With the line shown in FIG. 1, a zinc layer 11 is generated, which has four tiers 110. Due to the length of the individual stages of the galvanizing device and/or the applied current of the galvanic baths in combination with the throughput rate a desired layer thickness of the individual zinc tiers 110 can be adjusted. The throughput rate in the method according to the invention may for example be at least 5 m/min and preferably at least 10 m/min. The further parameters such as for example the bath length and current are preferably chosen such that the layer thickness of the individual zinc tiers 110 is in the range of 1 µm to 10 µm and preferably in the range of 0.5 to 3 µm. Thereby a zinc layer 11 with an overall layer thickness from 4 µm to 40 µm can be applied onto the base tube 10.

Figure 3:
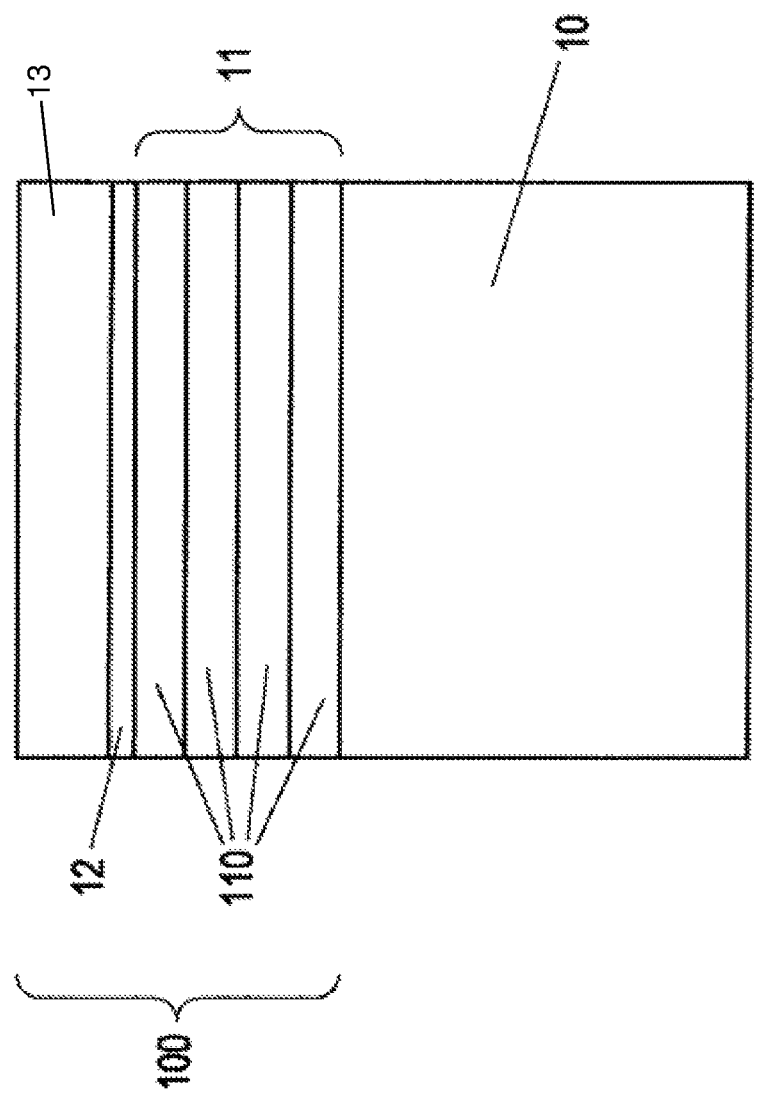
FIG. 3 shows a schematic sectional view of the layer structure of the coating system on a tube.

The structure of the coating system 100 is schematically shown again in FIG. 3. In this embodiment four zinc tiers 110, which create the zinc layer 11, are applied onto the base tube 10. On the zinc layer 11 a passivation layer 12 is applied, onto which a sealing layer 13 is applied. As can be derived from this schematic depiction, the individual layers of the coating system 100 are relatively thin, whereby the coating system 100 is not damaged even during a forming of the tube product 1.

With the line shown in FIG. 1 a continuous process can be carried out. In particular, the application of the coating system 100, which consists of the zinc layer 11, of the passivation layer 12 and of the sealing layer 13, can be performed in a continuous process. The throughput rate in the method according to the invention may for example be at least 5 m/min and preferably at least 10 m/min, that means the base tube is forwarded through the devices 20 to 24 at that speed, until the tube product 1 according to the invention is obtained.

Figure 2:
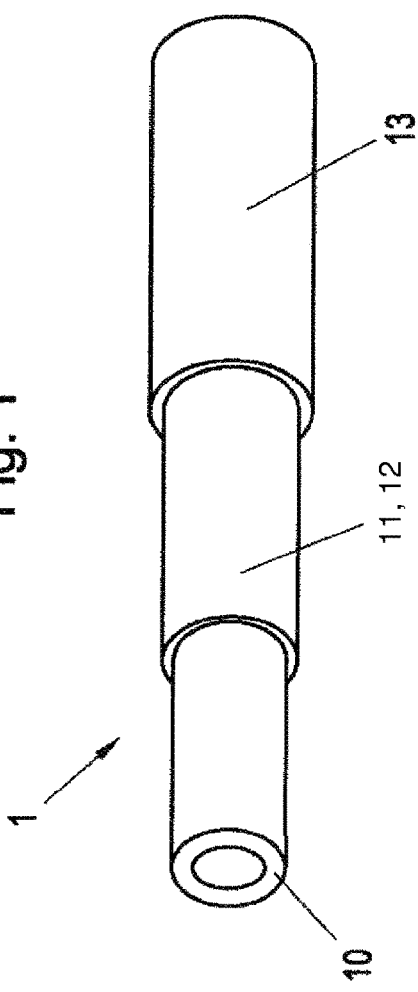
FIG. 2 shows a schematic depiction of an embodiment of the tube product according to the invention.

A schematic depiction of a tube product 1 is schematically shown in FIG. 2, wherein for better visibility the individual layers of the coating system 1 are partially not shown.

In FIG. 4 a tube sample of a tube product according to the invention is shown in comparison to two tube samples of conventionally galvanized and passivated tubes at neutral salt spray test (NSS Test) according to DIN EN ISO 9227 after 96 hours. The tube samples have a diameter of 15 mm and a wall thickness of 1.2 mm. The tube samples have been bent with a bending radius of 2.5× outer tube diameter. The samples, which are also referred to as tube bends, herein have been bent after the application of the coating system. As can be derived from FIG. 4, the conventionally coated tube bends show strong white rust already after 96 hours. The tube bends from the tube product according to the invention in contrast essentially show no white rust.

In FIG. 5 a tube sample of a tube product according to the invention is shown in comparison to two tube samples of conventionally galvanized and passivated tubes at neutral salt spray test (NSS Test) according to DIN EN ISO 9227 after 168 hours. The tube samples have a diameter of 15 mm and a wall thickness of 1.2 mm. The tube samples have been bent at 180° with a bending radius of 2.5× outer tube diameter. Also from FIG. 5 it can be derived, that even after 168 hours, the tube bends from the tube product according to the invention essentially show no white rust, while the white rust occurrence at the comparative samples has further increased.

The invention is not limited to the depicted embodiments. For example the tube product may have an additional lacquer layer on the sealing layer, which may be applied on the sealing layer for example by powder lacquering or wet varnishing. The lacquer layer essentially serves for decorative purposes and is not mandatory according to the invention, since the corrosion resistance by the coating system according to the invention is sufficient.

REFERENCE NUMBERS 1 tube product
10 base tube
100 coating system
11 zinc layer
110 tier
12 passivation layer
13 sealing layer
20 Pretreatment device
21 Galvanizing device
22 Passivation device
23 Induction device
24 Sealing device

The invention claimed is:

1. Tube product (1) with a base tube (10) made of a steel alloy with an inner circumference surface and an outer circumference surface, wherein the base tube (10) has a coating system (100) on at least part of the circumference surfaces, which has the following layer structure:
zinc layer (11), wherein the majority of the zinc layer (11) comprises zinc;
passivation layer (12), which is Cr-VI-free;
sealing layer (13)
characterized in that
the zinc layer (11) comprises at least three tiers (110), the sealing layer (13) has at least one from the group consisting of acrylate, polyester, polyacrylate, and nanoscale silicon oxide particles or silicates, and the sealing layer (13) on the passivation layer (12) has a layer thickness between 0.5 and 15 µm.

2. Tube product according to claim 1, characterized in that the sealing layer (13) has acrylate, polyester and/or polyacrylate at a portion of at least 70%.

3. Tube product according to claim 1, characterized in that the tiers (110) in the zinc layer (11) each have a layer thickness from 1 µm to 10 µm.

4. Tube product according to claim 1, characterized in that the zinc layer (11) has an overall layer thickness in the range from 3 to 40 µm.

5. Tube product according to claim 1, characterized in that the sealing layer (13) on the passivation layer (12) has a layer thickness between 0.9 µm and 10 µm.

6. Tube product according to claim 1, characterized in that a formed tube bend sample of the tube product (1) with a bending angle of 180° and a bending radius of at least 1.5×outer tube diameter has a white rust resistance of at least 24 hours in the neutral salt spray test according to DIN EN ISO 9227.

7. Tube product according to claim 6, characterized in that the tube bend sample of the tube product (1) has a length section, which is arch shaped in the axial direction, wherein the bending radius at the outer circumference surface is 2.5×outer tube diameter.

8. Tube product according to claim 1, characterized in that the zinc layer (11) has an overall layer thickness in the range from 4 to 25 µm.

9. Tube product according to claim 1, characterized in that the sealing layer (13) on the passivation layer (12) has a layer thickness in the range from 0.5 µm to 5 µm.

10. Tube product according to claim 1, characterized in that the sealing layer (13) on the passivation layer (12) has a layer thickness in the range from 0.5 to 3 µm.

11. Tube product according to claim 1, characterized in that a formed tube bend sample of the tube product (1) with a bending angle of 180° and a bending radius of at least 1.5×outer tube diameter has a white rust resistance of at least 96 hours in the neutral salt spray test according to DIN EN ISO 9227.

12. Tube product according to claim 1, characterized in that a formed tube bend sample of the tube product (1) with a bending angle of 180° and a bending radius of at least 1.5×outer tube diameter has a white rust resistance of at least 168 hours in the neutral salt spray test according to DIN EN ISO 9227.

13. Method for manufacturing a tube product, characterized in that the method at least comprises the following steps for applying a coating system (100) onto a base tube (10):

applying at least three tiers (110) of a zinc layer (11) onto the base tube (10) made of a steel alloy, wherein the majority of the zinc layer (11) comprises zinc;

applying a Cr-VI-free passivation agent for creating a passivation layer (12) on the zinc layer (11);

applying a sealing agent, wherein the sealing agent has at least one from the group consisting of acrylate, polyester, polyacrylate, and nanoscale silicon oxide particles or silicates, onto the passivation layer (12) for creating a sealing layer (13) with a layer thickness between 1 and 15 µm.

14. Method according to claim 13, characterized in that the method steps for applying the coating system (100) are carried out as a continuous method.

15. Method according to claim 13, characterized in that the throughput rate is at least 5 m/min.

16. Method according to claim 13, characterized in that the tube product is formed after the application of the coating system (100).

17. Method according to claim 13, characterized in that the tube is heated before and/or after the application of the sealing layer (13).

18. Method according to claim 13, characterized in that the throughput rate is at least 10 m/min.

19. Method according to claim 13, characterized in that the tube product is bent after the application of the coating system (100).

20. Method according to claim 17, characterized in that the tube is inductively heated before and/or after the application of the sealing layer (13).

* * * * *